United States Patent
Jenkins et al.

(10) Patent No.: US 8,095,153 B2
(45) Date of Patent: Jan. 10, 2012

(54) SYSTEM AND METHOD FOR GENERATING A RECOMMENDATION ON A MOBILE DEVICE

(75) Inventors: Andrew Jenkins, Charlotte, NC (US); Jeff Rayfield, Charlotte, NC (US)

(73) Assignee: Packet Video Corporation, San Diego, CA (US)

( * ) Notice: Subject to any disclaimer, the term of this patent is extended or adjusted under 35 U.S.C. 154(b) by 450 days.

(21) Appl. No.: 12/315,536

(22) Filed: Dec. 4, 2008

(65) Prior Publication Data

US 2009/0156182 A1  Jun. 18, 2009

Related U.S. Application Data

(60) Provisional application No. 61/007,343, filed on Dec. 12, 2007.

(51) Int. Cl.
*H04W 24/00* (2009.01)
(52) U.S. Cl. ............... 455/456.3; 455/440; 455/414; 701/213
(58) Field of Classification Search .......... 455/414, 455/418, 440, 456.1–456.6, 457, 459, 461, 455/466, 404.2; 701/213
See application file for complete search history.

(56) References Cited

U.S. PATENT DOCUMENTS

| | | |
|---|---|---|
| 5,790,848 A | 8/1998 | Wlaschin |
| 5,862,325 A | 1/1999 | Reed et al. |
| 6,141,682 A | 10/2000 | Barker |
| 6,167,092 A | 12/2000 | Lengwehasatit |
| 6,182,287 B1 | 1/2001 | Schneidewend et al. |
| 6,304,969 B1 | 10/2001 | Wasserman et al. |
| 6,407,680 B1 | 6/2002 | Lai et al. |
| 6,429,812 B1 * | 8/2002 | Hoffberg ............... 342/357.31 |
| 6,498,865 B1 | 12/2002 | Brailean et al. |
| 6,529,552 B1 | 3/2003 | Tsai et al. |
| 6,647,269 B2 * | 11/2003 | Hendrey et al. ............ 455/456.3 |
| 6,804,717 B1 | 10/2004 | Bakshi et al. |
| 6,865,600 B1 | 3/2005 | Brydon et al. |
| 6,941,324 B2 | 9/2005 | Plastina et al. |
| 7,006,631 B1 | 2/2006 | Luttrell |

(Continued)

FOREIGN PATENT DOCUMENTS

WO  WO 2009/075760  6/2009

OTHER PUBLICATIONS

PCT Search Report, Feb. 12, 2009, PacketVideo Corp.

(Continued)

*Primary Examiner* — Kamran Afshar
*Assistant Examiner* — Marisol Fahnert
(74) *Attorney, Agent, or Firm* — Patents & TMS, P.C.

(57) ABSTRACT

A system and a method generate a recommendation on a mobile device. The system and the method may use a time, a location, a venue and/or an event to generate the recommendation. Further, the system and the method may use an event database to determine current interests of the user. Still further, the system and the method for generating a recommendation on a mobile device may use a transactional history of the user and/or behavior of other users to generate the recommendation. The system and the method may recommend, for example, digital media, news and event information, editorial content and/or physical or digital merchandise. As a result, the system and the method may generate a recommendation that corresponds to the current interests of the user.

23 Claims, 1 Drawing Sheet

U.S. PATENT DOCUMENTS

| | | |
|---|---|---|
| 7,013,149 B2 * | 3/2006 | Vetro et al. ............... 455/456.1 |
| 7,139,279 B2 | 11/2006 | Jabri et al. |
| 2002/0002044 A1 | 1/2002 | Naruse et al. |
| 2003/0048855 A1 | 3/2003 | Klaghofer et al. |
| 2003/0067872 A1 | 4/2003 | Harrell et al. |
| 2003/0093267 A1 | 5/2003 | Leichtling et al. |
| 2003/0140343 A1 | 7/2003 | Falvo et al. |
| 2003/0142744 A1 | 7/2003 | Wu et al. |
| 2003/0229900 A1 | 12/2003 | Reisman |
| 2004/0068536 A1 | 4/2004 | Demers et al. |
| 2004/0070678 A1 | 4/2004 | Toyama et al. |
| 2004/0077313 A1 | 4/2004 | Oba et al. |
| 2004/0088369 A1 | 5/2004 | Yeager |
| 2004/0116067 A1 | 6/2004 | Karaoguz et al. |
| 2004/0158645 A1 | 8/2004 | Morinaga et al. |
| 2004/0174817 A1 | 9/2004 | Jabri et al. |
| 2004/0193762 A1 | 9/2004 | Leon et al. |
| 2004/0218673 A1 | 11/2004 | Wang et al. |
| 2005/0008030 A1 | 1/2005 | Hoffmann et al. |
| 2005/0028208 A1 | 2/2005 | Ellis et al. |
| 2005/0095981 A1 | 5/2005 | Benco |
| 2005/0097595 A1 | 5/2005 | Lipsanen et al. |
| 2006/0008256 A1 | 1/2006 | Khedouri et al. |
| 2006/0010472 A1 | 1/2006 | Godeny |
| 2006/0013148 A1 | 1/2006 | Burman et al. |
| 2006/0029041 A1 | 2/2006 | Jabri et al. |
| 2006/0031883 A1 | 2/2006 | Ellis et al. |
| 2006/0056336 A1 | 3/2006 | Dacosta |
| 2006/0056416 A1 | 3/2006 | Yang et al. |
| 2006/0159037 A1 | 7/2006 | Jabri et al. |
| 2006/0161635 A1 | 7/2006 | Lamkin et al. |
| 2006/0176877 A1 | 8/2006 | Jabri et al. |
| 2007/0011277 A1 | 1/2007 | Neff et al. |
| 2007/0076711 A1 | 4/2007 | Shuster |
| 2007/0076756 A1 | 4/2007 | Chan et al. |
| 2007/0093275 A1 | 4/2007 | Bloebaum et al. |
| 2007/0112935 A1 | 5/2007 | Espelien |
| 2007/0116036 A1 | 5/2007 | Moore |
| 2007/0143806 A1 | 6/2007 | Pan |
| 2007/0156770 A1 | 7/2007 | Espelien |
| 2007/0186003 A1 | 8/2007 | Foster et al. |
| 2007/0189275 A1 | 8/2007 | Neff |
| 2007/0220555 A1 | 9/2007 | Espelien |
| 2007/0226315 A1 | 9/2007 | Espelien |
| 2007/0233701 A1 | 10/2007 | Sherwood et al. |
| 2007/0245399 A1 | 10/2007 | Espelien |
| 2007/0266047 A1 | 11/2007 | Cortes et al. |
| 2007/0276864 A1 | 11/2007 | Espelien |
| 2007/0288478 A1 | 12/2007 | Dimaria et al. |
| 2008/0021952 A1 | 1/2008 | Molinie et al. |
| 2008/0027808 A1 | 1/2008 | Wilf |
| 2008/0037489 A1 | 2/2008 | Yitiz et al. |
| 2008/0039967 A1 | 2/2008 | Sherwood et al. |
| 2008/0090590 A1 | 4/2008 | Espelien |
| 2008/0154696 A1 | 6/2008 | Spiegelman et al. |

OTHER PUBLICATIONS

PCT Written Opinion, Feb. 12, 2009, PacketVideo Corp.

* cited by examiner

SYSTEM AND METHOD FOR GENERATING A RECOMMENDATION ON A MOBILE DEVICE

This application claims the benefit of U.S. Provisional Application Ser. No. 61/007,343 filed Dec. 12, 2007.

BACKGROUND OF THE INVENTION

The present invention generally relates to a system and a method for generating a recommendation on a mobile device. More specifically, the present invention relates to a system and a method for generating a recommendation on a mobile device that may use a time, a location, a venue and/or an event to generate the recommendation. Further, the system and the method for generating a recommendation on a mobile device may use an event database to determine the current interests of the user. Still further, the system and the method for generating a recommendation on a mobile device may use a transactional history of the user and/or behavior of other users to generate the recommendation. The system and the method for generating a recommendation on a mobile device may recommend, for example, digital media, news and event information, editorial content and/or physical or digital merchandise. As a result, the system and the method for generating a recommendation on a mobile device may generate a recommendation that corresponds to the current interests of the user.

Mobile digital media is a rapidly growing segment of the entertainment industry made feasible by the prevalence of mobile devices operating on high-speed cellular and wireless networks. Consumers of media on mobile devices are faced with an increasing array of content to consume. Mobile devices are limited in screen space and user input functionality, and users are generally viewing content for short durations. Therefore, proactively directing users toward content that is of interest to them is paramount in making the mobile media experience a successful one.

The rise of e-commerce through online shopping destinations, such as Amazon.com (registered trademark of Amazon.com, Inc.), has generated tremendous interest in the area of item recommendation. Merchants that are able to deploy an accurate recommendation system, typically based on individual and aggregated user purchasing and other information, may greatly increase revenue.

The addition of Global Positioning System (hereinafter "GPS") support to many mobile devices enables a large and growing number of applications that recommend and/or select content based on a location of a user. For example, hand-held and vehicle-based GPS systems may make restaurant recommendations according to the location of the user.

Most existing item recommendation systems do not consider both local time and location information of the user. Thus, the existing item recommendation systems miss important factors that may strongly influence a choice of which mobile media to consume. Conversely, existing location-based services that make recommendations, such as, for example, nearby restaurants, operate using simple selection and sorting criteria, and do not consider such factors as historical behavior of the user or the behavior of other users. Furthermore, no systems correlate local time and location information with a real world event to accurately determine a current environment of the user. For example, the same venue may be used one night for a sporting event and another night for a music performance. A location-based content recommendation system should consider the current environment of the user to avoid making inappropriate recommendations.

A need, therefore, exists for a system and a method for generating a recommendation on a mobile device. Further, a need exists for a system and a method for generating a recommendation on a mobile device that use a time, a location, a venue and/or an event to generate the recommendation. Still further, a need exists for a system and a method for generating a recommendation on a mobile device that use a transactional history of the user and/or behavior of other users to generate the recommendation. Moreover, a need exists for a system and a method for generating a recommendation on a mobile device that use an event database to generate the recommendation based on a specific event.

SUMMARY OF THE INVENTION

The present invention generally relates to a system and a method for generating a recommendation on a mobile device. More specifically, the present invention relates to a system and a method for generating a recommendation on a mobile device that use a time, a location, a venue and/or an event to generate the recommendation. Further, the system and the method for generating a recommendation on a mobile device may use an event database to determine the current interests of the user. Still further, the system and the method for generating a recommendation on a mobile device may use a transactional history of the user and/or behavior of other users to generate the recommendation. The system and the method for generating a recommendation on a mobile device may recommend, for example, digital media, news and event information, editorial content and/or physical or digital merchandise.

The system and the method for generating a recommendation on a mobile device may generate the recommendation based on the current interests of the user. For example, users present at a football game may have an interest in multimedia of football highlights from that day. Users present at a concert of a particular musician may have an interest in multimedia of that particular musician. The current interests of the user may change throughout the day depending on whether the user is at, for example, home, an airport, a shopping center, a concert, a play, a sports bar, a sporting event, a conference and/or the like. The system and the method for generating a recommendation on a mobile device may generate the recommendation based on the current interests of the user. Thus, the system and the method for generating a recommendation on a mobile device may determine the current interests of the user and generate the recommendation accordingly.

In an embodiment of the present invention, a method for generating a recommendation on a mobile device is provided. The method has the steps of providing a database of a plurality of events wherein each of the plurality of events is associated with event details; determining a location of the mobile device; determining a time and a date; comparing the location of the mobile device, the time and the date to the event details of the plurality of events; and transmitting the recommendation to the mobile device wherein the recommendation is determined by comparison of the location of mobile device, the time and the date to the event details of the plurality of events.

In an embodiment, the method has the step of determining a matching event from the plurality of events wherein the event details associated with the matching event correspond to the location of the mobile device, the time and the date and further wherein the recommendation is based on the matching event.

In an embodiment, the method has the step of transmitting information to the mobile device wherein the information is transmitted to the mobile device in response to an acceptance of the recommendation.

In an embodiment, the method has the step of associating a default event with the mobile device if the location of the mobile device, the time and the date do not correspond to the event details of the plurality of events wherein the recommendation is based on the default event.

In an embodiment, the method has the step of identifying a venue where the mobile device is located wherein the venue is determined from the location and further wherein one of the plurality of events occurs at the venue wherein the recommendation is based on the venue.

In an embodiment, the method has the step of transmitting a subject of the recommendation to the mobile device wherein a provider connected to the mobile device by a network transmits the subject of the recommendation to the mobile device via the network if the recommendation is accepted.

In another embodiment of the present invention, a method for generating a recommendation for a user of a mobile device is provided. The method has the steps of determining a first location of the mobile device; transmitting the recommendation to the mobile device wherein the recommendation is determined by the first location of the mobile device; accepting input from the user into the mobile device; and transmitting a subject of the recommendation to the mobile device if the input indicates that the user accepts the recommendation.

In an embodiment, the method has the step of determining a transactional history of other users who have been located at the first location wherein the recommendation is based on the transactional history.

In an embodiment, the method has the step of determining a transactional history of the user wherein the transactional history is transactions of the user when the mobile device was located at the first location and further wherein the recommendation is based on the transactional history.

In an embodiment, the subject of the recommendation is information regarding a business located near the first location.

In an embodiment, the subject of the recommendation is a media file.

In an embodiment, the method has the step of providing a database of a plurality of events wherein each of the plurality of events is associated with a specific location and further wherein the location of the mobile device is compared to the specific locations of the plurality of events wherein the recommendation is based on a matching event of the plurality of events and further wherein the specific location of the matching event corresponds to the first location of the mobile device.

In an embodiment, the method has the step of confirming completion of a commercial transaction wherein the user input has payment information from the user and further wherein the subject of the recommendation transmitted to the mobile device has confirmation of completion of the commercial transaction.

In an embodiment, the method has the step of determining a distance of the first location from a second location wherein the recommendation is based on the distance.

In another embodiment of the present invention, a system for generating a recommendation for a user is provided. The system has a first network; and a mobile device connected to the first network wherein the mobile device has a location and further wherein the first network transmits the recommendation to the mobile device wherein the recommendation is based on the location and further wherein the mobile device receives a subject of the recommendation if the recommendation is accepted wherein the recommendation is accepted based on input by the user on the mobile device.

In an embodiment, the system has a second network that transmits the subject of the recommendation to the mobile device.

In an embodiment, the first network transmits the subject of the recommendation to the mobile device.

In an embodiment, the system has a provider connected to the first network wherein the provider transmits the subject of the recommendation to the mobile device via the first network.

In an embodiment, the system has a server that connects the mobile device to the first network wherein the server is located in a position that is remote relative to the mobile device and further wherein the first network transmits the recommendation to the mobile device via the server.

In an embodiment, the system has a database connected to the first network wherein the database has a plurality of events and further wherein each of the plurality of events is associated with a specific location and further wherein the location of the mobile device is compared to the specific locations of the plurality of events wherein the recommendation is based on a matching event of the plurality of events and further wherein the specific location of the matching event corresponds to the location of the mobile device.

It is, therefore, an advantage of the present invention to provide a system and a method for generating a recommendation on a mobile device.

Another advantage of the present invention is to provide a system and a method for generating a recommendation on a mobile device that use a time, a location, a venue and/or an event to generate the recommendation.

And, another advantage of the present invention is to provide a system and a method for generating a recommendation on a mobile device that use a transactional history of the user.

Yet another advantage of the present invention is to provide a system and a method for generating a recommendation on a mobile device that use behavior of other users to generate the recommendation.

And, another advantage of the present invention is to provide a system and a method for generating a recommendation on a mobile device that recommends digital media, news and event information, editorial content and/or physical or digital merchandise.

Moreover, an advantage of the present invention is to provide a system and a method for generating a recommendation on a mobile device that determine current interests of the user and generate the recommendation accordingly.

Additional features and advantages of the present invention are described in, and will be apparent from, the detailed description of the presently preferred embodiments and from the drawings.

DETAILED DESCRIPTION OF THE PREFERRED EMBODIMENTS

The present invention generally relates to a system and a method for generating a recommendation on a mobile device.

More specifically, the present invention relates to a system and a method for generating a recommendation on a mobile device that may use a time, a location, a venue and/or an event to generate the recommendation. Further, the system and the method for generating a recommendation on a mobile device may use an event database to determine the current interests of the user. Still further, the system and the method for generating a recommendation on a mobile device may use a transactional history of the user and/or behavior of other users to generate the recommendation. The system and the method for generating a recommendation on a mobile device may recommend, for example, digital media, news and event information, editorial content and/or physical or digital merchandise.

Figures 1, 2:
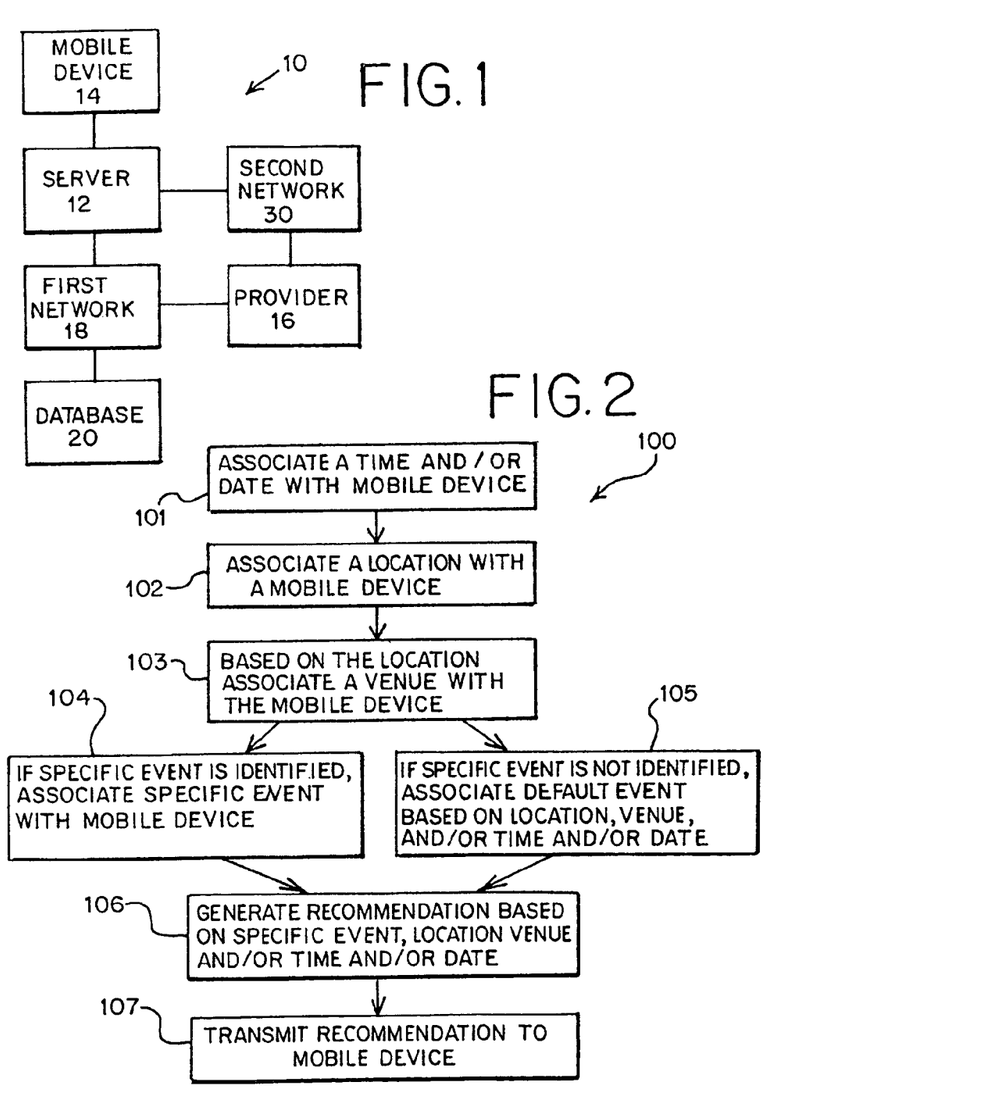
FIG. 1 illustrates a system for generating a recommendation on a mobile device in an embodiment of the present invention.
FIG. 2 illustrates a flowchart of a method for generating a recommendation on a mobile device in an embodiment of the present invention.

Referring now to the drawings wherein like numerals refer to like parts, FIG. 1 illustrates a system 10 which may have a server 12 for connecting a mobile device 14 to a first data communication network 18 (hereinafter "the first network 18"). The mobile device 14 may be, for example, a mobile cellular telephone, a personal digital assistant ("PDA"), a 4G mobile device, a 3G mobile device, a 2.5G mobile device, an internet protocol (hereinafter "IP") video cellular telephone, an ALL-IP electronic device, a laptop computer, a satellite radio receiver, a portable digital audio player, a portable digital video player and/or the like. The mobile device 14 may be connected to and/or may be in communication with the server 12. The mobile device 14 may be capable of transmitting, receiving, processing, accepting and/or displaying digital media. The mobile device 14 may have a display (not shown) for viewing, for consuming and/or for displaying the multimedia. The mobile device 14 may be any mobile device capable of transmitting, receiving, processing and/or displaying multimedia known to one having ordinary skill in the art.

The mobile device 14 may receive a recommendation. The recommendation may be digital media, news and event information, editorial content and/or physical or digital merchandise. The mobile device 14 may be any mobile device capable of transmitting, receiving, processing and/or displaying the recommendation known to one having ordinary skill in the art.

A database 20 may be connected to the first network 18. As a result, the database 20 may be connected to and/or may be accessible by the mobile device 14 and/or the server 12. The mobile device 14 may be remote with respect to the server 12 and/or the database 20. The database 20 may be local or may be remote with respect to the server 12. A provider 16 may be connected to the first network 18. The provider 16 may be, for example, a content service, a media store, a retail store, an advertiser, a ticket seller, a mobile network operator, an entertainment venue, a conference venue and/or the like. The present invention should not be limited to a specific embodiment of the provider 16. It should be understood that the provider 16 may be any provider as known to one of ordinary skill in the art.

The first network 18 may be, for example, an IP network, a wireless network, a wireline network, a local-area network, a wide-area network, a metropolitan area network, a paging network, a public switched telephone network and/or the like. The present invention should not be limited to a specific embodiment of the first network 18. It should be understood that the first network 18 may be any network capable of connecting and/or providing communication between the server 12 and the database 20 as known to one having ordinary skill in the art.

For example, the digital media may be a musical composition, a radio program, an audio book, an audio program, a television program, a movie, a music video, an animated work, a video program, a video game and/or a soundtrack and/or a video track of an audiovisual work, one or more digital photographs, a dramatic work, a film score and/or an opera and/or the like. The present invention should not be limited to a specific embodiment of the digital media. It should be understood that the digital media may be any digital media as known to one of ordinary skill in the art.

FIG. 2 generally illustrates a method 100 for generating a recommendation on a mobile device in an embodiment of the present invention. A time and/or date may be associated with the mobile device 14 as shown at step 101. The first network 18 may provide the time and/or date. Alternatively, the mobile device 14 may have a real time clock. The real time clock may be an integrated circuit that may provide the time and/or date. The real time clock may have a power source distinct from a power source of the mobile device 14. Alternatively, the time and/or date may be obtained from GPS signals to a GPS receiver located in the mobile device 14. It should be understood that the time and/or date may be obtained in any method as known to one of ordinary skill in the art.

A location may be associated with the mobile device 14 as shown at step 102. The location may be provided by the GPS receiver located in the mobile device 14. One or more GPS satellites may be positioned in orbit around earth and may provide the GPS signals to the GPS receiver. The GPS signals may provide coordinates of the GPS receiver. Therefore, the mobile device 14 may use the coordinates provided by the GPS receiver to identify the location of the mobile device 14. The location may be permanently recorded in order to establish a record of locations previously visited and/or the relative frequency of visits to particular locations.

The database 20 may identify a venue based on the location as shown at step 103. For example, the location may be used by the database to identify the venue as a home of the user, a stadium, a theater, an airport, a conference center, a shopping center, an auditorium and/or the like.

The database 20 may identify a specific event based on the location, the venue and/or the time and/or date as shown at step 104. The specific event may be associated with the mobile device 14. For example, if the mobile device 14 is located at a specific sporting event, the database may use the location, the venue and/or the time and/or date to determine the specific sporting event. As a further example, if the mobile device 14 is located at a specific music performance, the database may use the location, the venue, the time and/or date to determine the specific music performance.

If the specific event cannot be identified, a default event may be generated as shown at step 105. The default event may be based on the specific events associated with a similar location, similar venue and/or similar time and/or date. For example, if the database 20 does not have an entry for the location, the venue and/or the time and/or date, the default event may be associated with the mobile device 14 based on comparison of the location, the venue and/or the time and/or date of the mobile device 14 with a location, a venue information and/or a time and/or date of the specific events in the database 20. As further example, if the database 20 does not have an entry for the location, the default event may be an event currently occurring near to the location, i.e. a jazz concert occurring a quarter of a mile away; an event occurring at the location in the near future, i.e. a rock concert occurring in a week; and/or a typical usage for the identified venue, i.e. basketball if the venue is a sports stadium.

Association of the mobile device 14 with the specific event may be transmitted via the server 12 and/or the first network 18. Based on the association of the mobile device 14 with the specific event, the recommendation may be generated and/or may be transmitted to the mobile device 14 as shown at steps 106 and 107, respectively. The recommendation may be generated by the database 20 and/or the provider 16. The recommendation may be transmitted to the mobile device 14 by the first network 18. Alternatively, the recommendation may be transmitted from the provider 16 by a second data communication network 30 (hereinafter "the second network 30"). The recommendation may be transmitted from the second network 30 to the mobile device 14 via the server 12. Thus, the mobile device 14 may obtain the association of the mobile device 14 with the specific event via the first network 18 and may subsequently obtain the recommendation from the provider 16 via the second network 30.

If the user accepts the recommendation, a subject of the recommendation may be transmitted to the mobile device 14. For example, digital media, news and event information, editorial content and/or digital merchandise may be transmitted to the mobile device 14. The subject of the recommendation may be transmitted to the mobile device 14 by the first network 18 and/or the second network 30. Acceptance of the recommendation may complete a transaction to order and/or buy physical merchandise to be delivered to a shipping address of the user. The delivery of the subject of the recommendation may require the user to complete a financial transaction and/or pay a fee associated with the content.

The second network 30 may be, for example, an IP network, a wireless network, a wireline network, a personal area network, a local-area network, a metropolitan area network, a wide-area network, a paging network, a public switched telephone network and/or the like. The mobile device 14 may be remote with respect to and/or may be remotely connected to the second network 30. The present invention should not be limited to a specific embodiment of the second network 30. It should be understood that the second network 30 may be any network capable of connecting and/or providing communication between the provider 16 and the mobile device 14 as known to one having ordinary skill in the art.

The recommendation may be based on the specific event. For example, if the specific event is a concert by a specific musician, the recommendation may recommend ringtones of music by the specific musician. As a further example, if the event is a sporting event of a specific team, the recommendation may recommend news regarding the specific team. Generation of the recommendation based on the specific event may avoid problems that may arise from use of the venue alone, such as, for example, recommendation of sports information if a sporting venue is used for a concert, if a music theater is used for a conference and/or the like.

The recommendation may be based on general location guidelines. The general location guidelines may compare the location of the mobile device 14 relative to another location, such as, for example, home of the user, retail locations, restaurants and/or the like. For example, if the user is over one hundred miles from home, the recommendation may be a recommendation of local restaurant information. As a further example, if the user is within one mile of a movie theater, the recommendation may be a recommendation of a current movie trailer. As yet another example, the recommendation may be based on a number of visits to the location, such as recommendation of content associated with nearby tourist attractions and/or points of interest if the current location is identified as new to the user. The location may be identified as new to the user if the location has not been frequently visited in the past or has never been visited in the past, according to the stored records of previous locations.

The database 20 may have a transactional history of the user. The transactional history of the user may provide transactions of the user when the user is present at the location and/or the venue at the time and/or date. The recommendation may be generated based on the transactional history of the user. For example, if the user frequently downloads news information if the user is located at the airport in the morning, the recommendation may recommend the news information. As a further example, if the user frequently downloads merchandise information if the user is located at home in the evening, the recommendation may be a recommendation of the merchandise information.

The database 20 may have a transactional history of other users. The transactional history of the other users may provide transactions of the other users when the other users were present at the location and/or the venue of the user. The transactional history of the other users may provide transactions of the other users when the other users were present at events similar to the specific event of the user and/or locations similar to the location of the user. The recommendation may be generated based on the transactional history of the other users.

For example, the other users may frequently download football statistics for a specific team if present at the venue that is the home stadium of that team. Therefore, if the mobile device 14 is located at the venue that is the home stadium of the specific team, the recommendation to the user may be a recommendation of the football statistics of the specific team. As a further example, the other users may frequently download digital media of jazz music if located at Bourbon Street in New Orleans. Therefore, if the mobile device 14 is located at Bourbon Street in New Orleans, the recommendation may be a recommendation of the digital media of jazz music. As another example, the other users may frequently download weather updates if present at an airport. Therefore, if the mobile device 14 is located at the airport, the recommendation may be a recommendation of the weather updates.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for generating a recommendation on a mobile device, the method comprising the steps of:

providing a database of a plurality of events wherein each of the plurality of events is associated with event details;

determining a location of the mobile device;

determining a time and a date;

comparing the location of the mobile device, the time and the date to the event details of the plurality of events;

determining a matching event from the plurality of events wherein the event details associated with the matching event correspond to the location of the mobile device, the time and the date; and transmitting the recommendation to the mobile device wherein the recommendation is determined by comparison of the location of the mobile device, the time and the date to the event details of the plurality of events wherein the recommendation is based on the matching event;

associating a default event with the mobile device if the location of the mobile device, the time and the date do not correspond to the event details of the plurality of events wherein a first venue where the mobile device is located is determined using the location of the mobile device and further wherein the default event is based on a second venue which is a similar venue to the first venue wherein the recommendation is based on the default event.

2. The method of claim 1 further comprising the step of: recommending a multimedia file wherein the multimedia file is recommended by the mobile device displaying the recommendation and further wherein a provider connected to the mobile device by a network transmits the multimedia file to the mobile device using the network in response to user input on the mobile device indicating acceptance of the recommendation wherein the provider is a different entity than the database.

3. The method of claim 1 further comprising the step of: recommending physical merchandise wherein the physical merchandise is recommended by the mobile device displaying the recommendation and further wherein the physical merchandise is transmitted to a shipping address associated with the user of the mobile device in response to user input on the mobile device indicating acceptance of the recommendation.

4. The method of claim 1 further comprising the step of: associating a default event with the mobile device if the location of the mobile device, the time and the date do not correspond to the event details of the plurality of events wherein the recommendation is based on the default event.

5. The method of claim 1 further comprising the step of: identifying a venue where the mobile device is located wherein the venue is determined from the location and further wherein the matching event is determined based on the venue, the time and the date.

6. The method of claim 1 wherein each of the plurality of events is associated with an event time and further wherein the event time associated with the matching event is substantially the same as the time determined.

7. A method for generating a recommendation for a user of a mobile device, the method comprising the steps of: determining a first location of the mobile device; transmitting the recommendation to the mobile device wherein the recommendation is determined by the first location of the mobile device; accepting input from the user into the mobile device; transmitting a subject of the recommendation to the mobile device if the input indicates that the user accepts the recommendation; and providing a database of a plurality of scheduled events wherein each of the plurality of scheduled events is associated with a specific location, a time and a date and further wherein first time and a first date are determined for the mobile device located at the first location and further wherein the first location of the mobile device, the first time and the first date are compared to the specific location, the time and the date of each of the plurality of scheduled events wherein the recommendation is based on a matching event of the plurality of scheduled events and further wherein the specific location, the time and the date of the matching event correspond to the first location of the mobile device, the first time and the first date.

8. The method of claim 7 further comprising the step of: determining a transactional history of other users who have been located at the first location wherein the recommendation is based on the transactional history.

9. The method of claim 7 wherein the subject of the recommendation is information regarding a business located near the first location.

10. The method of claim 7 wherein the subject of the recommendation is a media file.

11. The method of claim 7 further comprising the step of: confirming completion of a commercial transaction wherein the user input has payment information from the user and further wherein the subject of the recommendation transmitted to the mobile device has confirmation of completion of the commercial transaction.

12. The method of claim 7 further comprising the step of: determining a distance of the first location from a home address of the user wherein the recommendation is based on comparison of the distance to a threshold value.

13. A system for generating a recommendation for a user, the system comprising: a first network; and a mobile device connected to the first network wherein the mobile device has a location at a time and a date and further wherein the first network transmits the recommendation to the mobile device wherein the recommendation is based on the location, the time, the date and a transactional history of the user and further wherein the mobile device receives a subject of the recommendation if the recommendation is accepted wherein the recommendation is accepted based on input by the user on the mobile device; and
a database connected to the first network wherein the database has a plurality of scheduled events and further wherein each of the plurality of scheduled events is associated with a specific location, a time and a date and further wherein the location, the time and the date of the mobile device are compared to the specific locations and the times and the dates of the plurality of scheduled events wherein the recommendation is based on a matching event of the plurality of scheduled events and further wherein the specific location, the time and the date of the matching event correspond to the location, the time and the date of the mobile device.

14. The system of claim 13 further comprising:
a second network which is a different network than the first network wherein the second network transmits the subject of the recommendation to the mobile device.

15. The system of claim 13 further comprising:
a provider connected to the first network wherein the provider transmits the subject of the recommendation to the mobile device using the first network and further wherein the provider is a different entity than the database.

16. The method of claim 1 further comprising the step of: determining a transactional history of other users who have been at events similar to the matching event wherein the recommendation is based on the transactional history.

17. The method of claim 1 wherein the event details are established before the corresponding event of the plurality of events occurs.

18. The method of claim 1 wherein the matching event is a sporting event of a specific sport and further wherein multimedia content of the specific sport is recommended by the recommendation.

19. The method of claim 1 wherein the matching event is a musical performance involving a specific artist and further wherein multimedia content of the specific artist is recommended by the recommendation.

20. The method of claim 1 wherein the matching event is a sporting event of a specific sport and further wherein physical merchandise related to the specific sport is recommended by the recommendation.

21. The method of claim 1 wherein the matching event is a musical performance involving a specific artist and further wherein physical merchandise related to the specific artist is recommended by the recommendation.

22. The method of claim 7 further comprising the step of: determining a transactional history of the user wherein the transactional history is merchandise purchased by the user when the mobile device was located at the first location and further wherein the recommendation is based on the transactional history.

23. A method for generating a recommendation for a user of a mobile device, the method comprising the steps of: determining a first location of the mobile device; transmitting the recommendation to the mobile device wherein the recommendation is determined by the first location of the mobile device; accepting input from the user into the mobile device; transmitting a subject of the recommendation to the mobile device if the input indicates that the user accepts the recommendation; and determining a transactional history of the user wherein the transactional history is a history of media content obtained by the user when the mobile device was located at the first location and further wherein the recommendation is based on the transactional history.

* * * * *

UNITED STATES PATENT AND TRADEMARK OFFICE
CERTIFICATE OF CORRECTION

PATENT NO.         : 8,095,153 B2
APPLICATION NO.    : 12/315536
DATED              : January 10, 2012
INVENTOR(S)        : Jenkins et al.

Page 1 of 1

It is certified that error appears in the above-identified patent and that said Letters Patent is hereby corrected as shown below:

Claims 1-23 should be deleted.

Col. 8, line 45 - Col. 11, line 12
Claims 1, 7, 8, 10, 11, 13-16, 21, 22, and 25-41, as presented in Patentees' Amendment Under 37 CFR Sec. 1.312 filed on October 21, 2011 and entered by the Patent Office on November 25, 2011, should be added.

Signed and Sealed this
Fourth Day of September, 2012

David J. Kappos
*Director of the United States Patent and Trademark Office*

UNITED STATES PATENT AND TRADEMARK OFFICE
CERTIFICATE OF CORRECTION

PATENT NO. : 8,095,153 B2  Page 1 of 6
APPLICATION NO. : 12/315536
DATED : January 10, 2012
INVENTOR(S) : Jenkins et al.

It is certified that error appears in the above-identified patent and that said Letters Patent is hereby corrected as shown below:

Delete the title page and substitute therefor the attached title page showing the corrected number of claims in patent.

Column 8, line 45 - Column 12, line 9, delete claims 1-23 and replace with following Claims 1-28.

This certificate supersedes the Certificate of Correction issued September 4, 2012.

Signed and Sealed this
Ninth Day of October, 2012

David J. Kappos
*Director of the United States Patent and Trademark Office*

(12) United States Patent
Jenkins et al.

(10) Patent No.: US 8,095,153 B2
(45) Date of Patent: Jan. 10, 2012

(54) SYSTEM AND METHOD FOR GENERATING A RECOMMENDATION ON A MOBILE DEVICE

(75) Inventors: Andrew Jenkins, Charlotte, NC (US); Jeff Rayfield, Charlotte, NC (US)

(73) Assignee: Packet Video Corporation, San Diego, CA (US)

( * ) Notice: Subject to any disclaimer, the term of this patent is extended or adjusted under 35 U.S.C. 154(b) by 450 days.

(21) Appl. No.: 12/315,536

(22) Filed: Dec. 4, 2008

(65) Prior Publication Data
US 2009/0156182 A1    Jun. 18, 2009

Related U.S. Application Data

(60) Provisional application No. 61/007,343, filed on Dec. 12, 2007.

(51) Int. Cl.
*H04W 24/00* (2009.01)

(52) U.S. Cl. ............. 455/456.3; 455/440; 455/414; 701/213

(58) Field of Classification Search ............. 455/414, 455/418, 440, 456.1 456.6, 457, 459, 461, 455/466, 404.2; 701/213
See application file for complete search history.

(56) References Cited

U.S. PATENT DOCUMENTS

| | | |
|---|---|---|
| 5,790,848 A | 8/1998 | Wlaschin |
| 5,862,325 A | 1/1999 | Reed et al. |
| 6,141,682 A | 10/2000 | Barker |
| 6,167,092 A | 12/2000 | Lengwehasatit |
| 6,182,287 B1 | 1/2001 | Schneidewend et al. |
| 6,304,969 B1 | 10/2001 | Wasserman et al. |
| 6,407,680 B1 | 6/2002 | Lai et al. |
| 6,429,812 B1 * | 8/2002 | Hoffberg ............ 342/357.31 |
| 6,498,865 B1 | 12/2002 | Brailean et al. |
| 6,529,552 B1 | 3/2003 | Tsai et al. |
| 6,647,269 B2 * | 11/2003 | Hendrey et al. ......... 455/456.3 |
| 6,804,717 B1 | 10/2004 | Bakshi et al. |
| 6,865,600 B1 | 3/2005 | Brydon et al. |
| 6,941,324 B2 | 9/2005 | Plastina et al. |
| 7,006,631 B1 | 2/2006 | Luttrell |

(Continued)

FOREIGN PATENT DOCUMENTS
WO    WO 2009/075760    6/2009

OTHER PUBLICATIONS

PCT Search Report, Feb. 12, 2009, PacketVideo Corp.

(Continued)

*Primary Examiner* — Kamran Afshar
*Assistant Examiner* — Marisol Fahnert
(74) *Attorney, Agent, or Firm* — Patents & TMS, P.C.

(57) ABSTRACT

A system and a method generate a recommendation on a mobile device. The system and the method may use a time, a location, a venue and/or an event to generate the recommendation. Further, the system and the method may use an event database to determine current interests of the user. Still further, the system and the method for generating a recommendation on a mobile device may use a transactional history of the user and/or behavior of other users to generate the recommendation. The system and the method may recommend, for example, digital media, news and event information, editorial content and/or physical or digital merchandise. As a result, the system and the method may generate a recommendation that corresponds to the current interests of the user.

28 Claims, 1 Drawing Sheet

1. A method for generating a recommendation on a mobile device, the method comprising the steps of:

providing a database of a plurality of events wherein each of the plurality of events is associated with event details;

determining a location of the mobile device;

determining a time and a date;

comparing the location of the mobile device, the time and the date to the event details of the plurality of events;

determining a matching event from the plurality of events wherein the event details associated with the matching event correspond to the location of the mobile device, the time and the date;

transmitting the recommendation to the mobile device wherein the recommendation is determined by comparison of the location of the mobile device, the time and the date to the event details of the plurality of events wherein the recommendation is based on the matching event; and     associating a default event with the mobile device if the location of the mobile device, the time and the date do not correspond to the event details of the plurality of events wherein a first venue where the mobile device is located is determined using the location of the mobile device and further wherein the default event is based on a second venue which is a similar venue to the first venue wherein the recommendation is based on the default event.

2. A method for generating a recommendation for a user of a mobile device, the method comprising the steps of:

determining a first location of the mobile device;

transmitting the recommendation to the mobile device wherein the recommendation is determined by the first location of the mobile device;

accepting input from the user into the mobile device;

transmitting a subject of the recommendation to the mobile device if the input indicates that the user accepts the recommendation; and     providing a database of a plurality of scheduled events wherein each of the plurality of scheduled events is associated with a specific location, a time and a date and further wherein a first time and a first date are determined for the mobile device located at the first location and further wherein the first location of the mobile device, the first time and the first date are compared to the specific location, the time and the date of each of the plurality of scheduled events wherein the recommendation is based on a matching event of the plurality of scheduled events and further wherein the specific location, the time and the date of the matching event correspond to the first location of the mobile device, the first time and the first date.

3. The method of Claim 2 further comprising the step of:

determining a transactional history of other users who have been located at the first location wherein the recommendation is based on the transactional history.

4. The method of Claim 2 wherein the subject of the recommendation is information regarding a business located near the first location.

5. The method of Claim 2 wherein the subject of the recommendation is a media file.

6. The method of Claim 2 further comprising the step of:

confirming completion of a commercial transaction wherein the user input has payment information from the user and further wherein the subject of the recommendation transmitted to the mobile device has confirmation of completion of the commercial transaction.

7. The method of Claim 2 further comprising the step of:

determining a distance of the first location from a home address of the user wherein the recommendation is based on comparison of the distance to a threshold value.

8. A system for generating a recommendation for a user, the system comprising:

a first network;

a mobile device connected to the first network wherein the mobile device has a location at a time and a date and further wherein the first network transmits the recommendation to the mobile device wherein the recommendation is based on the location, the time, the date and a transactional history of the user and further wherein the mobile device receives a subject of the recommendation if the recommendation is accepted wherein the recommendation is accepted based on input by the user on the mobile device; and a database connected to the first network wherein the database has a plurality of scheduled events and further wherein each of the plurality of scheduled events is associated with a specific location, a time and a date and further wherein the location, the time and the date of the mobile device are compared to the specific locations and the times and the dates of the plurality of scheduled events wherein the recommendation is based on a matching event of the plurality of scheduled events and further wherein the specific location, the time and the date of the matching event correspond to the location, the time and the date of the mobile device.

9. The system of Claim 8 further comprising:

a second network which is a different network than the first network wherein the second network transmits the subject of the recommendation to the mobile device.

10. The system of Claim 8 further comprising:

a provider connected to the first network wherein the provider transmits the subject of the recommendation to the mobile device using the first network and further wherein the provider is a different entity than the database.

11. The method of Claim 2 further comprising the step of:
   determining a transactional history of other users who have been at events similar to the matching event wherein the recommendation is based on the transactional history.

12. The method of Claim 2 wherein the matching event is a sporting event of a specific sport and further wherein multimedia content of the specific sport is <u>the subject of</u> the recommendation.

13. The method of Claim 2 wherein the matching event is a musical performance involving a specific artist and further wherein multimedia content of the specific artist is <u>the subject of</u> the recommendation.

14. The method of Claim 1 wherein the matching event is a sporting event of a specific sport and further wherein physical merchandise related to the specific sport is recommended by the recommendation.

15. The method of Claim 1 wherein the matching event is a musical performance involving a specific artist and further wherein physical merchandise related to the specific artist is recommended by the recommendation.

16. The method of Claim 2 further comprising the step of:
   determining a transactional history of the user wherein the transactional history is merchandise purchased by the user when the mobile device was located at the first location and further wherein the recommendation is based on the transactional history.

17. A method for generating a recommendation for a user of a mobile device, the method comprising the steps of:
   determining a first location of the mobile device;
   transmitting the recommendation to the mobile device wherein the recommendation is determined by the first location of the mobile device;
   accepting input from the user into the mobile device;
   transmitting a subject of the recommendation to the mobile device if the input indicates that the user accepts the recommendation; and
   determining a transactional history of the user wherein the transactional history is a history of media content obtained by the user when the mobile device was located at the first location and further wherein the recommendation is based on the transactional history.

18. The method of Claim 17 further comprising the step of:
   determining a transactional history of other users who have been located at the first location wherein the recommendation is based on the transactional history.

19. The method of Claim 17 wherein the subject of the recommendation is information regarding a business located near the first location.

20. The method of Claim 17 wherein the subject of the recommendation is a media file.

21. The method of Claim 17 further comprising the step of:
confirming completion of a commercial transaction wherein the user input has payment information from the user and further wherein the subject of the recommendation transmitted to the mobile device has confirmation of completion of the commercial transaction.

22. The method of Claim 17 further comprising the step of:
determining a distance of the first location from a home address of the user wherein the recommendation is based on comparison of the distance to a threshold value.

23. The method of Claim 2 further comprising the step of:
determining a transactional history of the user wherein the transactional history is a history of media content obtained by the user when the mobile device was located at the first location and further wherein the recommendation is based on the transactional history.

24. The system of Claim 8 wherein the subject of the recommendation is information regarding a business located near the location.

25. The system of Claim 8 further comprising the step of:
confirming completion of a commercial transaction wherein the input by the user has payment information from the user and further wherein the subject of the recommendation transmitted to the mobile device has confirmation of completion of the commercial transaction.

26. The system of Claim 8 further comprising the step of:
determining a distance of the location from a home address of the user wherein the recommendation is based on comparison of the distance to a threshold value.

27. The system of Claim 8 wherein the matching event is a sporting event of a specific sport and further wherein multimedia content of the specific sport is the subject of the recommendation.

28. The system of Claim 8 wherein the matching event is a musical performance involving a specific artist and further wherein multimedia content of the specific artist is the subject of the recommendation.